(12) United States Patent
Kim et al.

(10) Patent No.: US 8,510,854 B2
(45) Date of Patent: Aug. 13, 2013

(54) METHOD AND SYSTEM FOR DIGITAL RIGHTS MANAGEMENT AMONG APPARATUSES

(75) Inventors: Te-Hyun Kim, Gyeonggi-Do (KR); Seung-Jae Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 814 days.

(21) Appl. No.: 12/092,536

(22) PCT Filed: Oct. 31, 2006

(86) PCT No.: PCT/KR2006/004475
§ 371 (c)(1),
(2), (4) Date: May 2, 2008

(87) PCT Pub. No.: WO2007/058439
PCT Pub. Date: May 24, 2007

(65) Prior Publication Data
US 2009/0158437 A1    Jun. 18, 2009

(30) Foreign Application Priority Data

Nov. 18, 2005    (KR) .................... 10-2005-0110971

(51) Int. Cl.
*H04L 29/06* (2006.01)
(52) U.S. Cl.
USPC ................ 726/27; 726/26; 726/28; 726/29; 726/30; 726/31; 726/32
(58) Field of Classification Search
USPC .............. 726/26, 27, 28, 29, 30, 31, 32
See application file for complete search history.

(56) References Cited

U.S. PATENT DOCUMENTS

| 7,415,439 | B2* | 8/2008 | Kontio et al. ................... 705/53 |
| 7,421,411 | B2* | 9/2008 | Kontio et al. ................... 705/52 |
| 7,509,685 | B2* | 3/2009 | Lambert .......................... 726/27 |
| 7,624,451 | B2* | 11/2009 | Peinado ........................... 726/26 |
| 7,716,745 | B2* | 5/2010 | Peinado ........................... 726/26 |
| 7,779,479 | B2* | 8/2010 | Lee et al. ......................... 726/27 |
| 7,810,162 | B2* | 10/2010 | Lee et al. ......................... 726/27 |
| 2002/0013772 | A1* | 1/2002 | Peinado ........................... 705/51 |
| 2002/0026424 | A1 | 2/2002 | Akashi |
| 2004/0148523 | A1* | 7/2004 | Lambert ......................... 713/201 |
| 2004/0249768 | A1* | 12/2004 | Kontio et al. ................... 705/65 |
| 2005/0004875 | A1* | 1/2005 | Kontio et al. ................... 705/52 |
| 2005/0033967 | A1 | 2/2005 | Morino et al. |
| 2005/0044391 | A1* | 2/2005 | Noguchi et al. .............. 713/193 |
| 2005/0065891 | A1 | 3/2005 | Lee et al. |

(Continued)

FOREIGN PATENT DOCUMENTS

| JP | 2002-73421 A | 3/2002 |
| JP | 2004-110817 A | 4/2004 |

(Continued)

*Primary Examiner* — Bradley Holder
(74) *Attorney, Agent, or Firm* — Birch, Stewart, Kolasch & Birch, LLP (57) ABSTRACT

A digital rights management (DRM) method and system between devices are discussed. In order to allow a first device connected with a second device to use a rights object (RO) bound to the second device, the second device decodes the particular content or the RO and transmits the decoded particular content or the decoded RO to the first device. State information of the RO according to a usage amount of the particular content used by the first device is managed by the second device.

3 Claims, 9 Drawing Sheets

(56) References Cited

U.S. PATENT DOCUMENTS

| | | | |
|---|---|---|---|
| 2005/0091507 A1* | 4/2005 | Lee et al. | 713/182 |
| 2005/0097327 A1 | 5/2005 | Ondet et al. | |
| 2005/0210236 A1* | 9/2005 | Lee et al. | 713/153 |
| 2005/0210241 A1* | 9/2005 | Lee et al. | 713/158 |
| 2005/0210249 A1* | 9/2005 | Lee et al. | 713/168 |
| 2005/0210279 A1* | 9/2005 | Lee et al. | 713/194 |
| 2005/0216419 A1* | 9/2005 | Lee et al. | 705/59 |
| 2005/0216739 A1* | 9/2005 | Lee et al. | 713/168 |
| 2005/0216743 A1* | 9/2005 | Peinado | 713/176 |
| 2005/0216763 A1* | 9/2005 | Lee et al. | 713/200 |
| 2005/0267845 A1* | 12/2005 | Oh et al. | 705/51 |
| 2005/0268098 A1* | 12/2005 | Oh et al. | 713/168 |
| 2005/0268346 A1* | 12/2005 | Lee et al. | 726/27 |
| 2006/0006220 A1* | 1/2006 | Kwon et al. | 235/375 |
| 2006/0010498 A1* | 1/2006 | Oh et al. | 726/26 |
| 2006/0059094 A1 | 3/2006 | Oh et al. | |
| 2006/0059351 A1* | 3/2006 | Jung et al. | 713/176 |
| 2006/0154648 A1* | 7/2006 | Oh et al. | 455/411 |
| 2007/0027814 A1* | 2/2007 | Tuoriniemi | 705/59 |

FOREIGN PATENT DOCUMENTS

| | | |
|---|---|---|
| JP | 2004-149396 A | 5/2004 |
| JP | 2004-295875 A | 10/2004 |
| JP | 2005-055957 A | 3/2005 |
| JP | 2005-78653 A | 3/2005 |
| JP | 2005-92851 A | 4/2005 |
| WO | WO-2004/023759 A1 | 3/2004 |
| WO | WO-2005/091162 A1 | 9/2005 |
| WO | WO 2005/091163 A1 | 9/2005 |
| WO | WO 2005/093596 A1 | 10/2005 |
| WO | WO 2006/031046 A1 | 3/2006 |

\* cited by examiner

METHOD AND SYSTEM FOR DIGITAL RIGHTS MANAGEMENT AMONG APPARATUSES

TECHNICAL FIELD

The present invention relates to a digital rights management (DRM) system and, more particularly, to a method and system for allowing a first device to use a rights object (RO) bound to or owned by a second device.

BACKGROUND ART

In general, the DRM, a technique for stably protecting RO with respect to a digital content and systematically managing the digital content (or digital contents), provides a system for preventing the content from being illegally duplicated (copied), obtaining the RO with respect to the content, and protecting and managing a usage process of the content.

Figure 1:
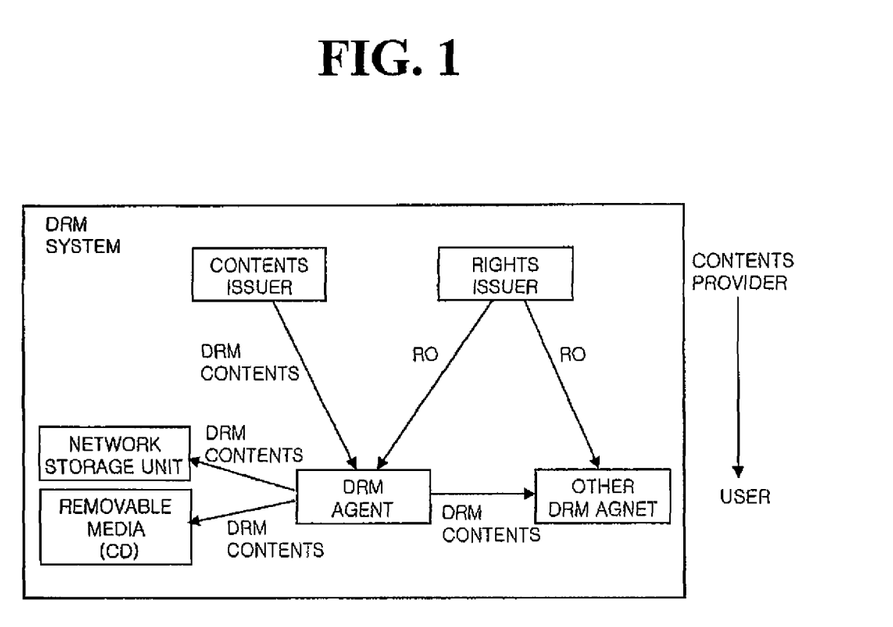
FIG. 1 is a view showing a structure of a general digital rights management (DRM) system.

FIG. 1 shows a general structure of a DRM system.

The general DRM system controls a user, upon receiving digital content from a contents provider, to use the received digital content as much as the RO given to the user. In this respect, the contents provider is an entity corresponding to a contents issuer (CI) and/or a rights issuer (RI).

The CI issues content (referred to hereinafter as 'DRM content' (or 'digital content')) protected by using a particular coding key to protect the content against a non-authorized user, and the RI issues the RO required for allowing using of the DRM content.

A DRM agent installed in a terminal receives the DRM content and the RO from the CI and the RI respectively, and controls using of the DRM content in the corresponding terminal by interpreting permission and/or constraint included in the RO.

The RO is divided into a stateful RO and a stateless RO (or a Non-stateful RO). The stateless RO is an RO that the terminal does not manage state information. The stateful RO is an RO that the terminal should elucidatorily manage state information so that permission(s) and constraint(s) indicated in the RO can be accurately applied. The constraint(s) managed by the state information include(s) at least one of <interval>, <count>, <timed-count> and <accumulated>.

The state information is information that indicates an amount available to use the content in the future and single state information is managed for each stateful RO. For example, the state information can be managed in the form of the spent usage number, and a spent usage time, etc., or can be managed in the form of the available usage number or a available usage time.

In general, the RO is encoded (or encrypted) by a public key of a particular device, so if a device does not have a private key that makes a pair with the public key, it cannot decode or use (or play) the DRM content related to the RO.

Thus, the general DRM system has many problems. That is, when the RO and its related DRM content are stored in a secure removable media (SRM) or a memory card such as a multimedia card, etc., if the RO is not issued for a terminal, the terminal cannot read the DRM content from the memory card (or SRM) to use it, although the memory card (or SRM) is inserted into the terminal.

In addition, in the general DRAM system, a certain RO is issued for a particular terminal, so if the secure removable media (SRM) stores the RO and its DRM content, only the particular terminal can read the DRM content and the RO from the SRM to use the DRM content, degrading utilization of the SRM.

DISCLOSURE OF THE INVENTION

One exemplary feature of the present invention is to provide a digital rights management (DRM) method and system between devices capable of allowing another device to use a rights object (RO) for using DRM content owned by a particular device.

Another exemplary feature of the present invention is to provide a DRM method and system between devices whereby an SRM can transfer an RO issued for the SRM to a terminal connected with the SRM to allow the terminal to use it.

To implement at least the above feature in whole or in parts, the present invention provides a DRM system between devices that may include: a terminal for requesting updating of state information of an RO with respect to content stored in a storage device; and the storage device for updating the state information of the RO according to the request.

To implement at least the above feature in whole or in parts, the present invention also provides a DRM system between devices that may include: a terminal for requesting updating of state information of a rights object (RO) with respect to content stored in the terminal; and a storage device for updating the state information of the RO according to the request.

To implement at least the above feature in whole or in parts, the present invention also provides a DRM method between devices that may include: requesting by a terminal particular content from a storage device when the particular content is stored in the storage device; decoding by the storage device the content and providing the content to the terminal; using by the terminal the decoded content; and managing by the storage device an RO of the content according to usage information of the content used by the terminal.

To implement at least the above feature in whole or in parts, the present invention also provides a DRM method between devices that may include: obtaining by the terminal decoding information for decoding particular content from a storage device when the particular content is stored in the terminal; decoding by the terminal the particular content by using the decoding information and using the decoded content; and managing by the storage device RO with respect to the content according to usage information of the content used by the terminal.

To implement at least the above feature in whole or in parts, the present invention also provides a DRM system between devices that may include: a first device for using particular content and requesting updating of state information of RO of the content owned by a second device; and a second device for allowing using of the content and updating the state information of the RO according to the request.

To implement at least the above feature in whole or in parts, the present invention also provides a DRM terminal that may include: an agent for requesting updating of state information of RO of content owned by a particular device.

The agent may decode the content from the particular device and receive the content.

The agent may receive decoding information for decoding the content from the particular device.

The decoding information can be one of the RO and a content encoding/decoding key included in the RO.

The agent may request the particular device to update the state information of the RO when the content start to be used, when the content is being used or when using of the content is completed.

To implement at least the above feature in whole or in parts, the present invention also provides a DRM storage device that may include: an agent for allowing a terminal to use content and updating state information of an RO of the content according to a request of the terminal.

The agent may decode the content and provide the decoded content to the terminal.

The agent may decode the RO of the content by using a private key of the storage device, encode the decoded RO by using a public key of the terminal, and transmit the encoded RO to the terminal.

The agent may decode the RO of the content by using a public key of the storage device, extract content encoding/decoding key from the decoded RO, encode the extracted content encoding/decoding key by using the public key of the terminal, and transmit the encoded encoding/decoding key to the terminal.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

MODES FOR CARRYING OUT THE PREFERRED EMBODIMENTS

In the present invention, when a first device desires to use a rights object (RO) for using digital rights management (DRM) content issued for the second device, the second device may decode (or decrypt) the DRM content and provide the decoded (or decrypted) DRM content to the first device, decode and encode the RO and provide it to the first device so that the first device can use it, or provide a content encryption key (CEK) included in the RO to the first device.

The exemplary embodiments of the present invention will now be described in detail with reference to the accompanying drawings.

Figure 2:
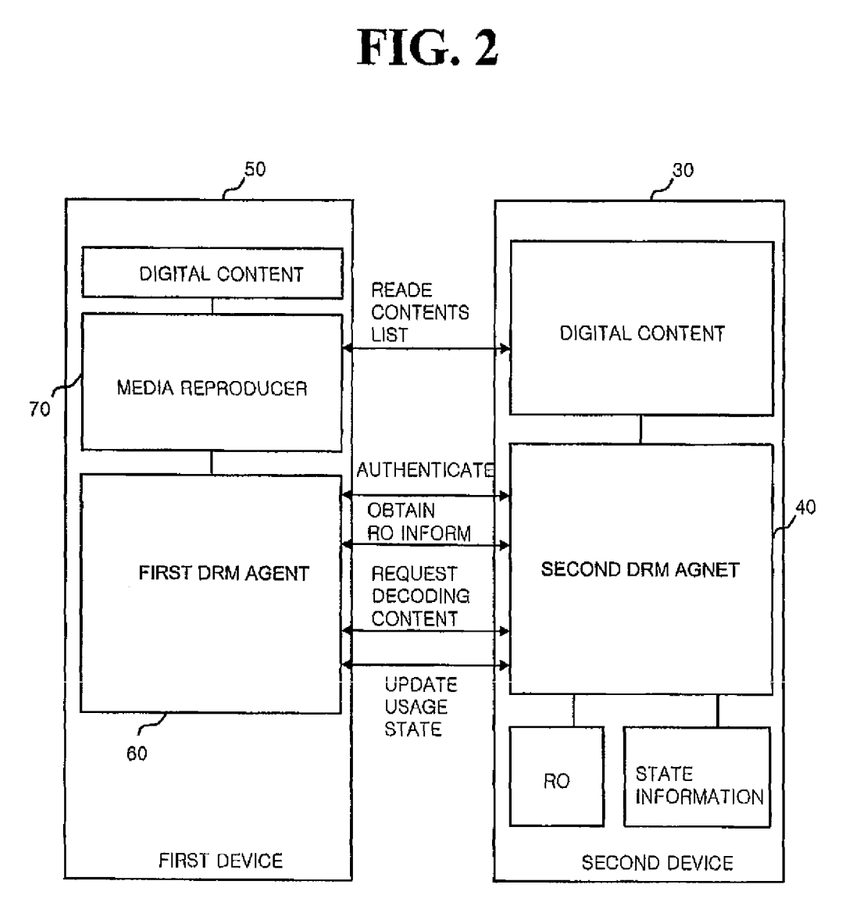
FIG. 2 is a view showing a structure of a DRM system between devices according to an exemplary embodiment of the present invention.

FIG. 2 is a view showing a structure of a DRM system between devices according to an exemplary embodiment of the present invention.

As shown in FIG. 2, a DRM system between devices includes: a first device 50 for using particular content and requesting updating of state information of RO of the content owned by a second device 30; and the second device 30 for allowing using of the particular content and updating the state information of the RO according to the request.

The first device 50 performs mutual authentication with the second device 30, and when using of the particular content is instructed by a user, the first device 50 receives the decoded particular content from the second device 30 and uses them or decodes the previously stored content by using decoding information for decoding the particular content provided from the second device 30 and uses them, and requests updating of the state information so that the state information of the RO with respect to the content can be updated according to usage information.

The second device 30 decodes the content and provides them to the first device 50, provides decoding information with which the first device 50 can decode the content to the first device 50, and manages the RO of the content according to usage information of the content used by the first device 50.

The DRM system between devices according to the exemplary embodiment of the present invention can further include a contents provider for issuing content and an RO with respect to the contents in the name of the second device 30.

The contents provider comprises a contents issuer (CI) 30 for providing content (e.g., the DRM content) and a rights issuer (RI) 40 for issuing the RO of the DRM content.

The first device 50 comprises a first DRM agent 60 for performing mutual authentication with the second device 30, obtaining decoded DRM content or decoding information of the DRM content by interworking with the second device 30 and using the DRM content thereby, and requesting to update the state information of the RO according to usage information of the DRM content; and a media reproducer 70 for reproducing (using) the DRM content.

The first device 60 further comprises a media library (not shown) for storing meta information of the DRM content and meta information of the RO; and a user interface unit (not shown) for interfacing with a user under the control of the first DRM agent 60.

The first device 60 further includes a communication module (not shown) for communicating with the contents provider; and a memory (not shown) for storing an application program and data of the first DRM agent 60.

The second device 30 includes a processor and a memory and performs a simple calculation (or processing) function.

The second device 30 includes a second DRM agent 40 for performing mutual authentication with the first device 60, decoding the DRM content and providing them to the first device 50 or providing decoding information with which the DRM content can be decoded to the first device 50, and updating state information of the RO according to a state information update request transmitted from the first device 50.

The second device 30 further includes a memory (not shown) for storing DRM agent information including the DRM content and the RO.

The DRM agent information includes DRM content, meta information of the DRM content, the RO, meta information of the RO, state information (RI context) of the RO, information on an RI that issues the RO, and information (domain context0 of connection domain for issuing the RO.

The second DRM agent 40 can set a security link with the first device 50.

The first device 50 can be a terminal. Alternatively, the first device can be one of devices for constituting a home networking system.

The second device 30 can be a storage device. Alternatively, the second device 30 can be a mobile terminal. The second device 30 can be a memory card or a secure removable media (SRM) (hereinafter, the SRM represents the memory card). The second device 30 can be one of devices constituting the home networking system.

The SRM can comprise one of a secure digital (SD) card, a multimedia card (MMC), a smart media card (SMC), a micro subscriber identification module (SIM) card, and various memory cards that can store multimedia.

The decoding information for decoding the content includes one of the RO and the Contents Encryption Key (CEK) included in the RO.

The RO can be encoded by binary or by XML or other text. The second DRM agent 40 may perform encoding conversion as necessary.

The operation of the DRM system according to the present invention constructed as described above will now be explained with reference to the accompanying drawings.

For example, the case where the second device 30 is connected with the first device 50, the first device 50 requests the RO of the DRM content owned by the second device 30, and the first device 50 uses the content with permission of the second device 50 will be explained.

When the second device 30 is connected with the first device 50, the first device 50 recognizes the second device 30 and performs a mutual authentication procedure with the second DRM agent 40 of the second device 30. In this case, the first and second DRM agents 60 and 40 check device IDs of them each other.

When the mutual authentication procedure is successfully completed, the first and second DRM agents 60 and 40 establish a stable communication channel. In this case, establishment of the stable communication channel between the first and second DRM agents 60 and 40 is selectively performed.

The first DRM agent 60 obtains RO information from the second device 30. Namely, the first DRM agent 60 reads DRM agent information from the second device 30 and stores it in the media library (not shown). The first DRM agent 60 makes a list of contents that can be currently used by using the read DRM agent information. The contents list is displayed when a user wants to check contents desired to be used. The contents list allows the first device 60 to stably use the DRM contents stored in the second device 30 by interworking with the second device 30.

The DRM contents (or the DRM content) stored in the second device 30 can be duplicated (copied) to the second device 30 to the first device 50 at a time point when the user desires, or can be automatically copied when the first device 50 wants to use (reproduce) the DRM content. The DRM content can be stored in the first device 50 for a long time or the first DRM agent 60 can directly decode the DRM content so the DRM content can be quickly processed. Once the DRM content is copied, although the second device 30 is detached or disconnected from the first device 50, the DRM content can be retained in the memory (not shown) as long as desired by the user. Thus, when the first device 50 wants to use the DRM content, it does not need to read the DRM content again from the second device 30.

The operation of reproducing the DRM content by allowing the first and second devices 50 and 30 to interwork with each other when the user selects one of DRM content displayed through the second device 30 and reproduces it will now be described.

Herein, the content using unit of the first device 50, for example, the media reproducing unit 70, requests the first DRM agent 60 to decode content to be reproduced. When the RO of the content to be reproduced is issued for the first device 50, the first DRM agent 60 checks rights of the content, decodes the content, and provides the decoded content to the media reproducing unit 70. Then, the media reproducing unit 70 reproduces the content.

If, however, the RO of the content to be reproduced is issued for the second device 30, the first DRM agent 60 cannot solely perform the process of verifying the rights object of the content and decoding it and can perform the process by interworking with the second DRM agent 40 of the second device 30.

The reason is because in order to decrypt the content of the second device 30, a private key of the second device 30 is required and in a public key-based structure system, the private key of a terminal must not be leaked.

Figure 3:
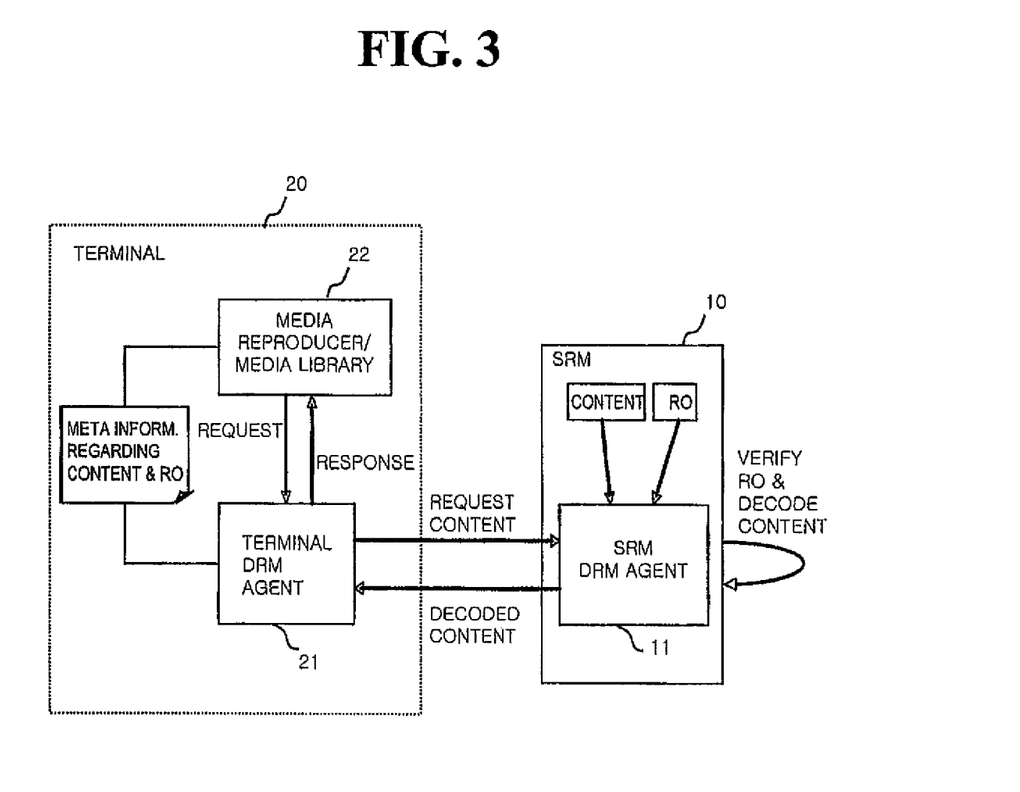
FIG. 3 is a view showing a structure of a system for decrypting content by a terminal DRM agent together with an SRM DRM agent when particular content exist in an SRM.

FIG. 3 shows a structure of a system for decrypting the content by the first DRM agent 60 of the first device 50 together with the second DRM agent 40 of the second device 30 when the content exists in the second device 30.

As shown in FIG. 3, the first device 50 comprises a terminal and the second device 30 comprises a secure removable media (SRM) 10. The first DRM agent 60 includes a terminal DRM agent 21 and the second DRM agent 40 includes an SRM DRM agent 11 (or a DRM agent of the SRM 11).

When the user instructs a particular operation to use particular content stored in the SRM 10 through the terminal 20 connected with the SRM 10, a media reproducer/media library 22 of the terminal 20 requests the particular content from the terminal DRM agent 21, and when the particular content as decoded are transferred from the terminal DRM agent 21, the media reproducer/media library 22 of the terminal reproduces the decoded particular content.

The terminal DRM agent 21 requests the particular content requested by the media reproducer/media library 22 and a particular operation of the user for using the particular content from the SRM DRM agent 11, and when the decoded particular content and state information are transmitted from the SRM DRM agent 21, the terminal DRM agent 21 controls such that the particular operation using the particular content to be performed based on the state information.

When the particular content and the particular operation for using the particular content are requested by the terminal DRM agent 21, the SRM DRM agent 11 of the SRM 10 checks an RO and state information with respect to the particular content and verifies the use authority. If permitted, the SRM DRM agent 11 decodes the particular content, provides the decoded particular content and/or state information to the terminal DRM agent 21, and manages the RO and/or state information according to usage information of the particular content used by the terminal 20. The SRM DRM agent 11 extracts Contents Encryption Key (CEK) from the RO, decodes the content, and provides the decoded content to the terminal. The terminal DRM agent 21 reproduces the content, and when it starts reproducing of the content, the terminal DRM agent 21 requests the SRM DRM agent 11 to update the state information. In addition, the terminal DRM agent 21 can request updating of the state information according to a usage amount during the reproducing. When the reproducing of the content is completed, the terminal DRM agent 21 requests the SRM DRM agent 11 to update the state information. The SRM DRM agent 11 updates the state information of the RO according to the state information update request.

Figure 4:
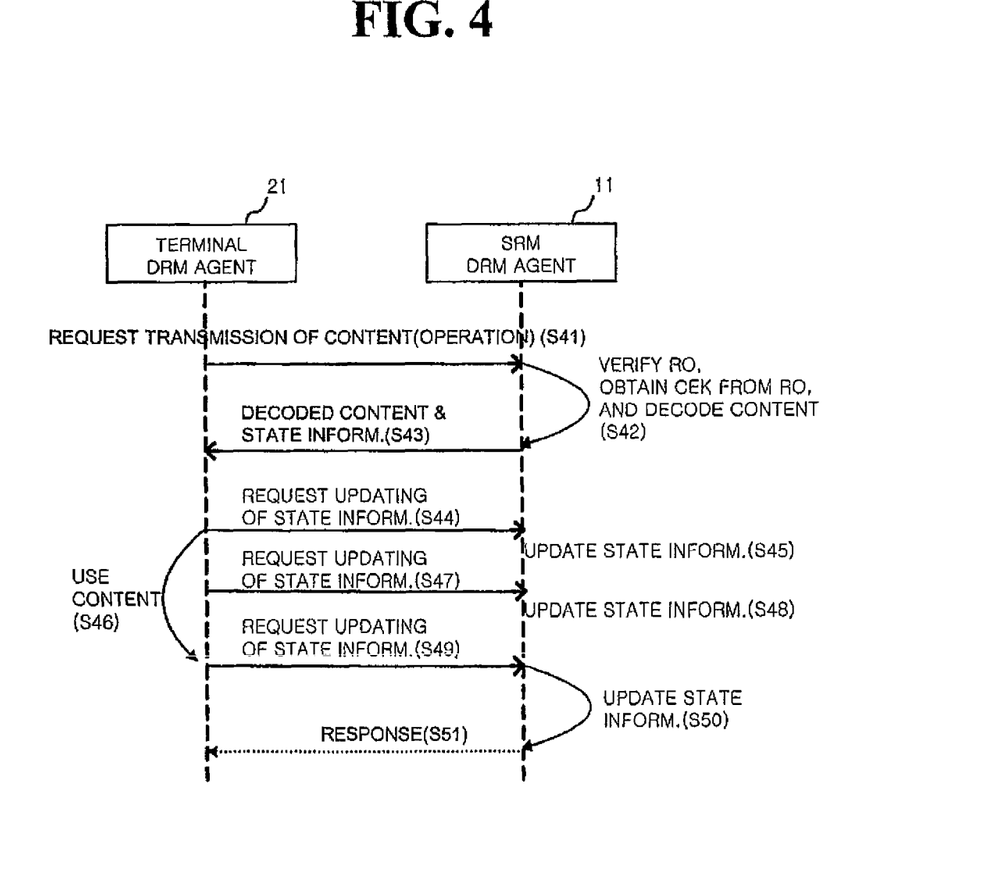
FIG. 4 shows one example of a method for decrypting the content by the terminal DRM agent together with the SRM DRM agent when the particular content exists in the SRM.

FIG. 4 shows an example of a method for decrypting the particular content by the first DRM agent of the first device 50 together with the second DRM agent 40 of the second device 30 when the particular content exists in the second device 30.

For example, a case where the first device 50 is formed as the terminal 20, the second device 60 is formed as the SRM 10, the first DRM agent 60 is formed as the terminal DRM agent 21, and the second DRM agent 40 is formed as the SRM DRM agent 11 will now be described.

When the user instructs the particular operation to use the particular content stored in the SRM 10 and if the particular operation is, for example, a reproducing operation, the media reproducer/media library 22 requests the particular content from the terminal DRM agent 21. The terminal DRM agent 21 requests the particular content (contents object (CO)) and the particular operation for using the particular content from the SRM DRM agent 11 (step S41). Herein, the particular operation can be, for example, an operation of reproducing the particular content, an operation of printing the particular content or an operation of executing games of the particular content, etc.

Upon receiving the request, the SRM DRM agent 11 interprets the RO and/or state information with respect to the particular content to verify the use authority. For example, the use authority is verified as follows: The RO includes information regarding a permission and a constraint. In case that the operation requested by the terminal is "Play" and a current time is Dec. 13, 1998, if "Play" exists among the permissions of the RO and the expiry of the use among the constraint is May 30, 1999, the operation of requesting using of the content of the terminal 20 satisfies the conditions, so the SRM DRM agent 11 determines that the terminal 20 has the authority to use the content.

When the terminal 20 has the use authority, the SRM DRM agent 11 decodes the CEK stored in the RO and then decodes the particular content by using the decoded CEK (step S42).

The SRM DRM agent 11 transfers the decoded particular content (CO') and the state information to the terminal 20 (herein, if the authority to use the particular content is stateless RO, the state information is not transferred). In this case, when a protection channel has been established between the terminal DRM agent 21 and the SRM DRM agent 11, the decoded content (CO') and the state information are transmitted through the protection channel (step S43).

The terminal DRM agent 21 supplies the decoded content (CO') to the media reproducer 22. The media reproducer 22 reproduces the decoded content (CO') (step S46). At least one of the cases that when the content start to be used, when the content is being used and when the content is completely used, the terminal DRM agent 21 can request the SRM DRM agent 11 to update the state information (steps S44, S47 and S49). When the DRM agent 21 requests updating of the state information of the RO while the content is being used, it can request the updating at certain intervals.

There are two methods for the terminal DRM agent 21 to request updating of the state information of the RO. The first method is that the terminal DRM agent 21 updates the state information according to a usage amount of the content and transfers the updated state information value to the SRM DRM agent 11. The second method is that the terminal DRM agent 21 informs the SRM DRM agent 11 about the usage amount (usage time or usage number, etc.) of the content and requests the SRM DRM agent 11 to update the state information stored in the SRM DRM agent 11.

When the terminal DRM agent 21 requests the updating of the state information of the RO at certain intervals, it can request the updating every time the content is used or at every determined time.

The SRM DRM agent 11 updates the state information stored in the memory 12 of the SRM 10 (steps S45, S48 and S50) according to the state information update request which is transmitted at one point when the using of content is started, while the content is being used or when the using of the content is terminated from the terminal DRM agent 21 (steps S44, S47 and S49).

In addition, when the terminal DRM agent 21 requests the particular operation for using the content from the SRM DRM agent 11, it can also request the desired number of usage times or a usage time. In this case, the SRM DRM agent 11 may provide the decoded content to the terminal DRM agent in the step S43 and update the state information of the RO.

In this manner, the terminal DRM agent 21 can manage the state information of the RO.

Herein, if the RO is a stateless RO, the terminal DRM agent 21 can inform that the using of the content is started or completed (or finished), and the SRM DRM agent 11 does not perform the process of updating the state information of the RO.

Figure 5:
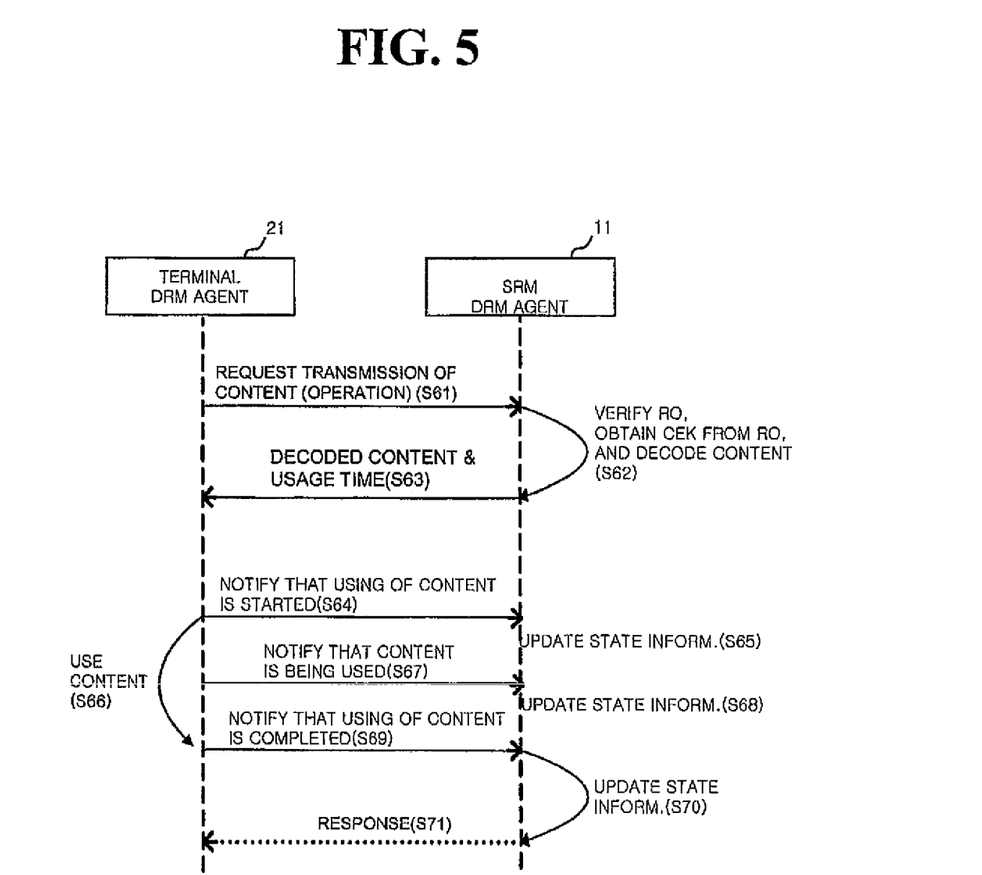
FIG. 5 shows another example of the method for decrypting the content by the terminal DRM agent together with the SRM DRM agent when the particular content exists in the SRM.

FIG. 5 shows another example of the method for decrypting the particular content by the first DRM agent 60 of the first device 50 together with the second DRM agent 40 of the second device 30 when the particular content exists in the second device 30.

For example, the case where the first device 50 is formed as the terminal 20, the second device 60 is formed as the SRM 10, the first DRM agent 60 is formed as the terminal DRM agent 21, and the second DRM agent 40 is formed as the SRM DRM agent 11 will be described.

When the user instructs the particular operation to use the particular content stored in the SRM 10 and if the particular operation is, for example, a reproducing operation, the media reproducer/media library 22 requests the particular content from the terminal DRM agent 21. The terminal DRM agent 21 requests the particular content (contents object (CO)) and the particular operation for using the particular content from the SRM DRM agent 11 (step S61).

Upon receiving the request, the SRM DRM agent 11 interprets the RO and/or state information with respect to the particular content to verify the use authority.

Having the use authority, the SRM DRM agent 11 decodes a Contents Encryption Key (CEK) stored in the RO by using a private key of the memory care 10 and decodes the particular content by using the decoded CEK (step S62).

The SRM DRM agent 11 transfers the decoded particular content (CO') together with usage time information to the terminal 20 (step S63). In this case, when a protection channel has been established between the terminal DRM agent 21 and the SRM DRM agent 11, the decoded content (CO') and the state information can be transmitted through the protection channel.

The terminal DRM agent 21 supplies the decoded content (CO') to the media reproducer 22. The media reproducer 22 reproduces the decoded content (CO') (step S66). The terminal DRM agent 21 controls not to reproduce the content in excess of the received usage time.

When the content starts to be reproduced, the terminal DRM agent 21 informs the SRM DRM agent 11 of the start of the use (step S64). In addition, the terminal DRM agent 21 can inform that the content is being used at certain intervals while the content is being reproduced (step S67).

When the reproducing of the content is completed, the terminal DRM agent 21 informs the SRM DRM agent 11 accordingly (step S39).

The SRM DRM agent 11 updates the state information regarding the RO of the content with reference to the notification on the start of using of the content and the notification on termination of using of the content from the terminal DRM agent 21 (steps S65 and S70).

Figure 6:
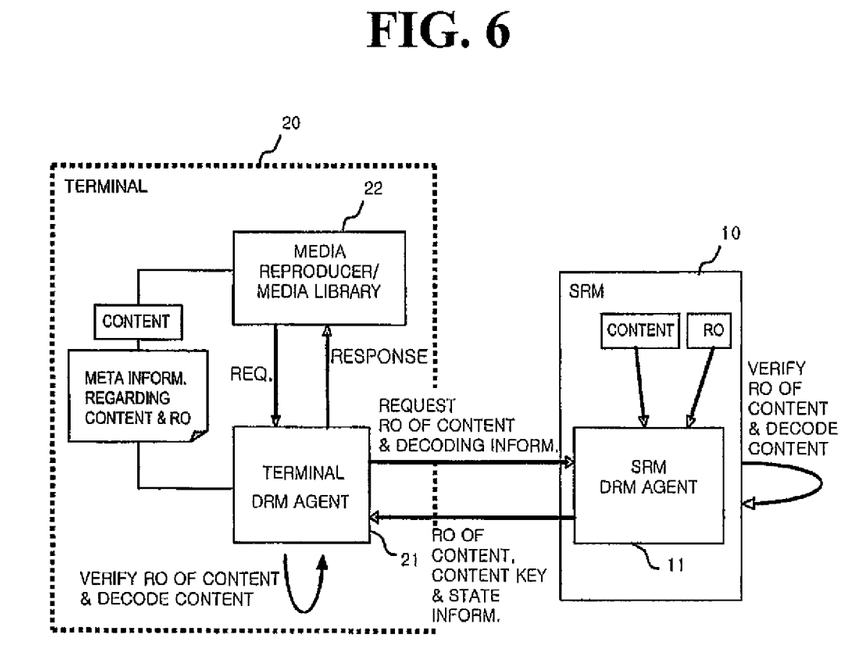
FIG. 6 is a view showing a structure of a system for decrypting particular content by the terminal DRM agent together with the SRM DRM agent when the particular content has been copied to a terminal.

FIG. 6 shows a structure of a system for decrypting the particular content by the first DRM agent 60 (e.g., the terminal DRM agent 21) together with the second DRM agent 40 (e.g., the SRM DRM agent 11) when the particular content as copied are in the first device 50 (e.g., the terminal 20).

When the user instructs the particular operation for using the particular content stored in the terminal 20, the media reproducer/media library 22 requests the terminal DRM agent 21 to decode the particular content. Then, the decoded particular content is transmitted from the terminal DRM agent 21 and reproduced.

The terminal DRM agent 21 requests the use authority for using the particular content requested by the media reproducer/media library 22 and the decoding information for decoding the particular content from the SRM DRM agent 11 of the SRM 10. When the decoding information for decoding the particular content and/or state information are transmitted from the SRM DRM agent 11, the terminal DRM agent 21 controls to decode particular content by using the decoding information so as to be used based on the state information.

When the decoding information for decoding the particular content is requested from the terminal DRM agent 21, the SRM DRM agent 11 of the SRM 10 verifies the authority of the terminal to use the content by checking the RO and/or state information with respect to the particular content. When the terminal DRM agent 21 has the use authority, the SRM DRM agent 11 provides the decoding information for decoding the particular content and/or state information to the terminal DRM agent 21 and manages the RO and/or state information according to usage information of the particular content used by the terminal 20.

Figure 7:
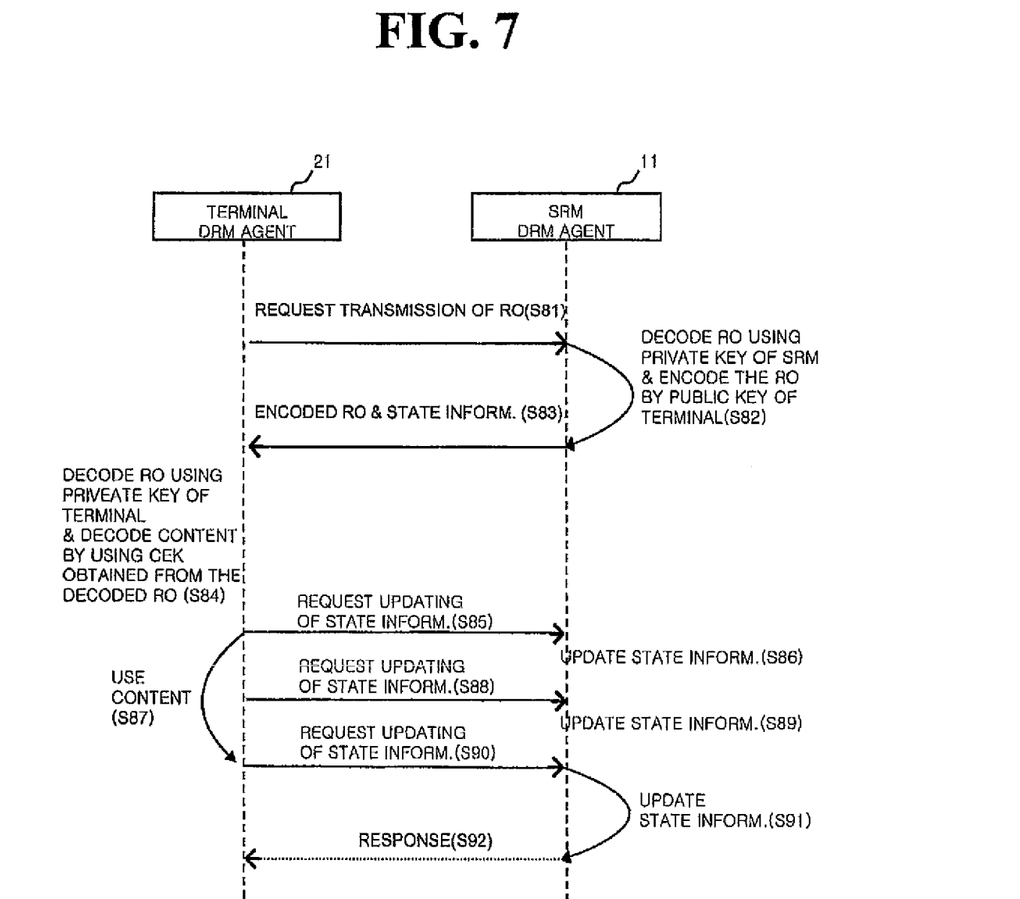
FIG. 7 is a view showing one example of a method for decrypting particular content by the terminal DRM agent together with the SRM DRM agent when the particular content has been copied to the terminal.

FIG. 7 shows an example of a method for decrypting the particular content by the first DRM agent 60 of the first device 50 together with the second DRM agent 40 of the second device 30.

For example, a case where the first device 50 is formed as the terminal 20, the second device 60 is formed as the SRM 10, the first DRM agent 60 is formed as the terminal DRM agent 21, and the second DRM agent is formed as the SRM DRM agent 11 will be described.

Herein, the SRM DRM agent 11 provides the RO for decoding the particular content to the terminal DRM agent 21, and the terminal DRM agent 21 manages the state information of the RO.

When the user instructs the particular operation for using the particular content stored in the terminal 10 and if the particular operation is, for example, a reproducing operation, the media reproducer/media library 22 request the terminal DRM agent 21 to decode the particular content. The terminal DRM agent 21 request the RO with respect to the particular content from the SRM DRM agent 11(S81).

The SRM DRM agent 11 verifies the use authority by interpreting the requested RO and/or state information. If the terminal has the use authority, the SRM DRM agent 11 decodes the RO by using the private key of the SRM 10, encodes (or encrypts) the decoded RO by using the public key of the terminal 10 (step S82), and transmits the encoded RO (RO') and state information to the terminal 20 (step S83).

The terminal DRM agent 21 decodes (or decrypts) the encoded RO by using the private key of the terminal 10, decodes the particular content by using the CEK obtained by decoding the RO, and provides the decoded particular content to the media reproducer/media library 22 (step S84). The media reproducer/media library 22 reproduces the provided particular content (step S87).

At least one of the cases that when the content start to be used, when the content is being used and when the content is completely used, the terminal DRM agent 21 can request the SRM DRM agent 11 to update the state information (steps S85, S88 and S90). When the terminal DRM agent 21 requests updating of the state information of the RO while the content is being used, it can request the updating at certain intervals.

There are two methods for the terminal DRM agent 21 to request updating of the state information of the RO. The first method is that the terminal DRM agent 21 updates the state information according to a usage amount of the content and transfers the updated state information value to the SRM DRM agent 11. The second method is that the terminal DRM agent 21 informs the SRM DRM agent 11 about the usage amount (usage time or usage number, etc.) of the content and requests the SRM DRM agent 11 to update the state information stored in the SRM DRM agent 11.

When the terminal DRM agent 21 requests the updating of the state information of the RO at certain intervals, it can request the updating every time the content is used or at every determined time.

The SRM DRM agent 11 updates the state information stored in the memory 12 of the SRM 10 (steps S86, S89 and S91) according to the state information update request which is transmitted at one point when the using of content is started, while the content is being used or when the using of the content is terminated from the terminal DRM agent 21 (steps S85, S89 and S91).

In this manner, the terminal DRM agent 21 can manage the state information of the RO.

In addition, when the terminal DRM agent 21 requests the RO from the SRM DRM agent 11, it can also request a desired usage number of times or usage time together. In this case, the SRM DRM agent 11 can provide the protected RO to the terminal DRM agent 21 in the step S83 and update the state information of the RO of the SRM 10.

Herein, in case that the RO is a stateless RO, when the reproducing of the content is completed, the terminal DRM agent 21 informs of the completion of the using of the content, and because the SRM DRM agent 11 does not manage the state information of the RO, it does not perform the process of updating the state information.

Figure 8:
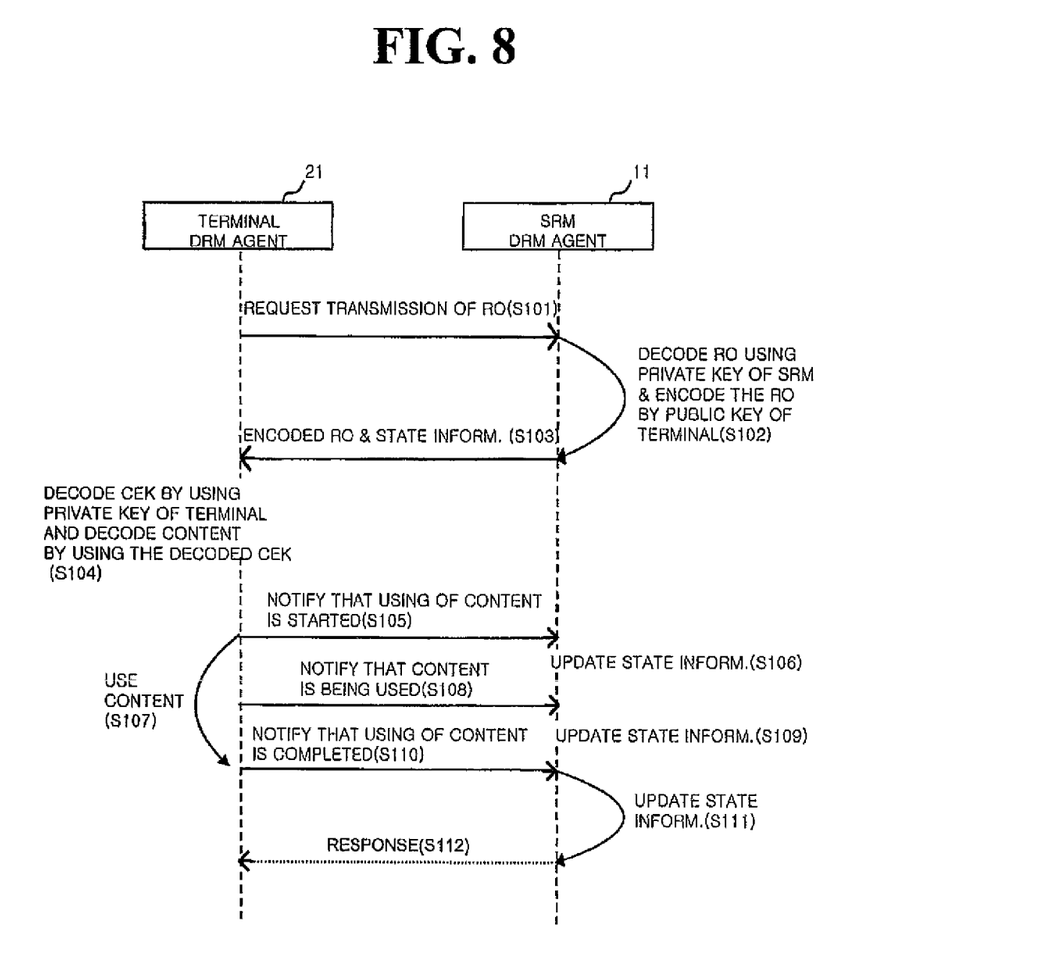
FIG. 8 is a view showing another example of the method for decrypting particular content by the terminal DRM agent together with the SRM DRM agent when the particular content has been copied to the terminal.

FIG. 8 shows an example of a method for decrypting the particular content by the first DRM agent 60 (e.g., the terminal DRM agent 21) together with the second DRM agent 40 (e.g., the SRM DRM agent 11) when the copied particular content are in the first device 50 (e.g., in the terminal 20).

The operation in the steps S101~S104 are the same as that of the steps S81~S84.

When the terminal 20 reproduces the content, the terminal DRM agent 21 informs the SRM DRM agent 11 that reproducing the content starts (step S105), and when reproducing of the content is completed, the terminal DRM agent 21 informs the SRM DRM agent 11 of the completion of the use (step S110). In addition, during the reproducing, the terminal DRM agent 21 can inform at certain intervals that the content is being used (step S108).

The SRM DRM agent 11 updates the state information with respect to the RO of the content with reference to the time point at which the notification about the start of the use of the content and the time point at which the notification about the termination of the use of the content from the terminal DRM agent 21 (steps S106 and S111).

Figure 9:
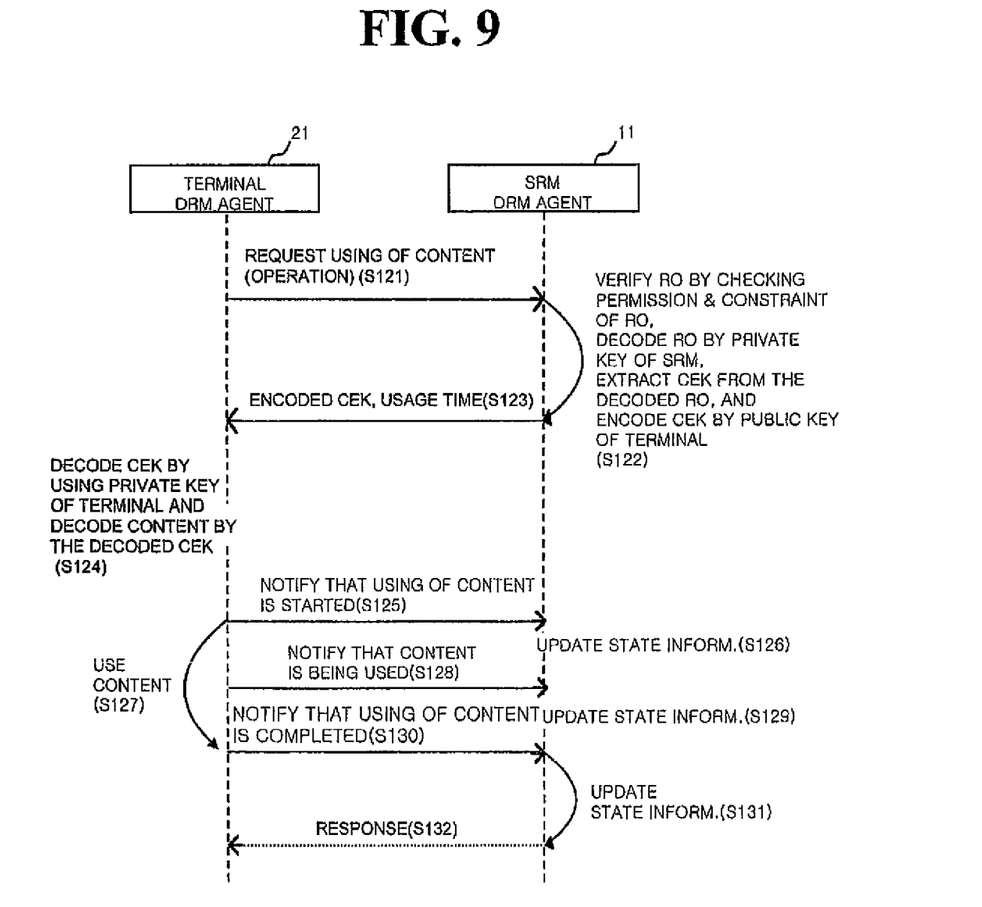
FIG. 9 is a view showing still another example of the method for decrypting particular content by the terminal DRM agent together with the SRM DRM agent when the particular content has been copied to the terminal.

FIG. 9 shows another example of a method for decrypting the particular content by the first DRM agent 60 (e.g., the terminal DRM agent 21) together with the second DRM agent 40 (e.g., the SRM DRM agent 11) when the copied particular content is in the first device 50 (e.g., the terminal 20). Herein, the SRM DRM agent 11 provides the CEK and the usage time information to the terminal DRM agent 21 and directly manages the state information.

When the user instructs the particular operation to use the particular content stored in the terminal 10 and if the particular operation is, for example, a reproducing operation, the media reproducer/media library 22 requests the terminal DRM agent 21 to decode the particular content. The terminal DRM agent 21 requests the SRM DRM agent 11 to permit the particular operation for using the particular content (step S121).

Upon receiving the request, the SRM DRM agent 11 verifies whether the terminal 20 has the use authority with respect to the particular operation for using the particular content. When the SRM DRM agent 11 verifies the use authority, it can refer to the RO and/or state information with respect to the particular content stored in the memory 12.

The use authority is verified as follows: The RO includes information regarding a permission and a constraint. In case that the operation requested by the terminal is "Play" and a current time is Dec. 13, 1998, if "Play" exists among the permissions of the RO and the expiry of the use among the constraint is May 30, 1999, the operation of requesting using of the content of the terminal 20 satisfies the conditions, so the SRM DRM agent 11 determines that the terminal 20 has the authority to use the content.

When the terminal 20 has the use authority, the SRM DRM agent 11 decodes the RO by using the private key of the SRM 10, extracts the CEK from the decoded RO, and encodes the extracted CEK by using the public key of the terminal (step S122). And then, the SRM DRM agent 11 transmits the encoded CEK to the terminal 20. Alternatively, the CEK can be transferred through a coding channel set between the terminal DRM agent 21 and the SRM DRM agent 11.

In this case, the constraint information for allowing using of the particular content can be transmitted together with the CEK (step S123). If the constraint of the RO with respect to the particular content is a usage time, the usage time information is transmitted together with the CEK. If the RO is a stateless RO, the usage time information is not transmitted.

The terminal DRM agent 21 decodes the received CDK by using the private key of the terminal, decodes the particular content by using the decoded CEK, and provides the decoded particular content to the media reproducer/media library 22 (step S124). The media reproducer/media library 22 reproduces the decoded particular content (step S127).

The terminal DRM agent 21 informs the state of the use at the time point of starting reproduction (step S125), and when reproducing of the content is completed, the terminal DRM agent 21 informs the SRM DRM agent 11 about the completion of the use at the time point when the reproducing is completed (step S130). In addition, while the content is being reproduced, the terminal DRM agent 21 can inform at certain intervals the SRM DRM agent 11 that the content is being used at certain intervals (step S128).

The SRM DRM agent 11 updates the state information with respect to the RO of the content with reference to the time point at which the notification about the start of the use of the content and the time point at which the notification about the termination of the use of the content from the terminal DRM agent 21 (steps S126 and S131).

On the other hand, in case that the OR is stateful, the operation that the SRM DRM agent 11 manages differently the state information according to a type of the constraint of the RO will now be described.

When the constraint of the stateful RO is the number of times of play (or playing times) (or count) (it represents how many times the content can be played), the terminal can request the playing times, which it wants to play. For example, the terminal can request RO for playing of two times. The SRM can also transmit the requested number of times when it transmits the corresponding CEK to the terminal. The SRM updates the state information by the remaining number of times (here, the remaining number of times is referred as to "the available number of times") obtained by subtracting the requested number of times. No matter whether the SRM is detached from the terminal while the content is being reproduced, the terminal can keep reproducing the content by the requested number of times.

In case of the stateful RO whose constraint is the play time (it represents how long the content can be played), when the SRM hands over the CEK, it also informs a currently remaining play time (an available play time). In this case, the SRM DRM agent stores the use start time. The media reproducer of the terminal reproduces the content for the remaining play time and when the lay time lapses, the media reproducer stops reproducing. If the user stops reproducing in the course of reproducing, the terminal returns the remaining play time obtained by subtracting time taken for reproducing to the SRM. If the SRM is detached from the terminal during the reproducing, the media reproduce of the terminal stops reproducing and the SRM updates the state information by calculating the remaining play time based on the time point at which the SRM is detached.

In case that the constraint is the expiry of the use (or interval), if the expiry of the use has lapsed, the media reproducer does not perform reproducing any longer, and the reproducing can be continued regardless of the detachment of the SRM. In addition, when the user stops reproducing, calculation and updating of the remaining state are not required.

As so far described, the DRM system and method between the devices according to the present invention have many advantages.

That is, for example, the RO for using the DRM content owned by a particular device can be used by another device.

The memory can transfer the RO issued for the SRM to the terminal connected with the SRM and the terminal can use the DRM content based on the RO issued for the SRM (or the RO bound to the SRM), so every terminal which has undergone the mutual authentication procedure with the SRM, can use the RO bound to the SRM. Thus, the utilization of the SRM (or the memory card) can be improved.

In a home networking system, an RO bound to the particular device can be used by another device.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

The invention claimed is:

1. A digital rights management (DRM) method in a terminal, comprising:
   receiving, by a terminal DRM agent, a DRM content and a right object (RO);
   wherein the RO is issued by a right issuer (RI) in the name of a card DRM agent, and
   wherein the DRM content is issued by a content issuer (CI);
   requesting, by the terminal DRM agent from the card DRM agent, information on a right associated with the RO to use a particular content of the DRM,
   receiving, by the terminal DRM agent from the card DRM agent, a response to the request, the response including the information on the right associated with the RO,
   wherein the information includes state information for the right associated with the RO;
   decoding, by the terminal DRM agent, the particular content using the information on the right associated with the RO;
   transmitting, by the terminal DRM agent to the card DRM agent, each of a notification of a start of using the particular content, a notification of using the particular content, and a notification of a termination of using the particular content;
   wherein the state information indicates an amount of the particular content available for future use, and
   wherein each of the notifications are used by the card DRM agent to update the state information; and
   receiving, by the terminal DRM agent from the card DRM agent, a response to each of the notifications,
   wherein the state information is stored in a memory of a card DRM and is updated with respect to the RO by the card DRM agent according to each of the notifications.

2. The method of claim 1, wherein the terminal DRM agent manages the state information to apply permissions and constraints indicated in the RO.

3. A digital rights management (DRM) method in a card, comprising:
   receiving, by a card DRM agent from a terminal DRM agent, a request for information on a right associated with a right object (RO) to use a particular content of a DRM content,
   wherein the RO is issued in the name of the card DRM agent,
   wherein the DRM content is issued by a content issuer (CI),
   transmitting, by the card DRM agent to the terminal DRM agent, the information on the right associated with the RO,
   wherein the information includes state information for the right associated with the RO, and
   wherein the terminal DRM agent decodes the particular content using the information on the right associated with the RO;
   receiving, by the card DRM agent from the terminal DRM agent, each of a notification of start of using the particular content, a notification of using the particular content, and a notification of termination of using the particular content;
   updating, by the card DRM agent, the state information in response to each of the notifications,
   wherein the state information indicates an amount of the particular content available for future use,
   transmitting, by the card DRM agent to the terminal DRM agent, a response to each of the notifications,
   wherein the state information is stored in a memory of a card DRM and is updated with respect to the RO by the card DRM agent according to each of the notifications.

* * * * *